US012789545B2

(12) United States Patent
Benson

(10) Patent No.: US 12,789,545 B2
(45) Date of Patent: Nov. 10, 2026

(54) APPARATUS FOR PRINTING INDICIA

(71) Applicant: LegiLiner, LLC, Gainesville, GA (US)

(72) Inventor: Polly Benson, Gainesville, GA (US)

(73) Assignee: LegiLiner, LLC, Gainesville, GA (US)

( * ) Notice: Subject to any disclaimer, the term of this patent is extended or adjusted under 35 U.S.C. 154(b) by 96 days.

(21) Appl. No.: 18/243,947

(22) Filed: Sep. 8, 2023

(65) Prior Publication Data

US 2025/0083463 A1 Mar. 13, 2025

(51) Int. Cl.
*B41K 1/22* (2006.01)
*B41K 1/52* (2006.01)

(52) U.S. Cl.
CPC . *B41K 1/22* (2013.01); *B41K 1/52* (2013.01)

(58) Field of Classification Search
None
See application file for complete search history.

(56) References Cited

U.S. PATENT DOCUMENTS 2,562,557 A * 7/1951 Limberg .................. B41K 1/22 401/218
3,465,673 A * 9/1969 Oppenheim ....... A63H 33/3083 101/328
3,577,918 A * 5/1971 Wayfield .................. B41K 1/50 101/328
2009/0031909 A1 * 2/2009 Faber ..................... B41K 1/006 101/329

OTHER PUBLICATIONS

Legiliner, printout of https://www.legiliner.com/blogs/news as archived by the Internet Archive on Jun. 23, 2021 (Year: 2021).*

* cited by examiner

*Primary Examiner* — Joshua D Zimmerman
(74) *Attorney, Agent, or Firm* — Troutman Pepper Locke LLP; Christopher J. Capelli

(57) ABSTRACT

The subject disclosure relates to an apparatus for printing indicia on a surface to be printed. The apparatus includes a housing having opposing first and second ends and a plurality of indicia cylinders extending partially from the first end of the housing. Each indicia cylinder is rotatably mounted along a common axis in the first end of the housing and includes an outer surface provided with a template having a defined pattern for imparting indicia on an adjacent surface to be printed. Further provide is a plurality of ink supplies, wherein each ink supply communicates to an outer surface portion of a respective indicia cylinder such that each indicia cylinder is communicatively coupled to a dedicated ink supply.

18 Claims, 5 Drawing Sheets

APPARATUS FOR PRINTING INDICIA

BACKGROUND

1. Field

This disclosure relates to an apparatus for printing indicia on a surface, and more specifically to an apparatus to facilitate handwriting skills.

2. Description of Related Art

Students with poor handwriting skills and abilities need the assistance of adaptive lines to help them learn to write clearly and neatly. This is especially true for young children just learning how to write and for individuals with learning disabilities and visual impairments. Traditional handwriting aids consist of worksheets and/or tape with lines preprinted. Such conventional methods and systems have generally been considered satisfactory for their intended purpose.

However, there is still a need in the art for an improved apparatus for printing indicia on a surface, particularly for adding adaptive lines to any piece of paper or surface to assist those with poor handwriting skills and abilities.

SUMMARY

The subject disclosure relates to an apparatus for printing indicia on a surface to be printed. The apparatus includes a housing having opposing first and second ends and a plurality of indicia cylinders extending partially from the first end of the housing. Each indicia cylinder is rotatably mounted along a common axis in the first end of the housing and is preferably associated with a dedicated ink supply. An outer surface of each indicia cylinder is provided with a template having a defined pattern for imparting indicia on an adjacent surface to be printed. A plurality of ink supplies is provided in each indicia cylinder. Each ink supply communicates to an outer surface portion of a respective indicia cylinder such that each indicia cylinder is communicatively coupled to a dedicated ink supply.

In certain embodiments, the first end of the housing defines a plurality of recesses. Each recess is configured and adapted to rotatably receive a respective indicia cylinder. Each recess is separated from each other by a respective recess wall. The first end of the housing includes an engagement assembly for rotatably engaging an indicia cylinder in a respective recess. The engagement assembly is configured to provide an annular snap-joint between each indicia cylinder and recess. Each engagement assembly includes a respective receiving detent defined in each respective recess wall. Each indicia cylinder includes a protrusion member extending from each side wall portion of each indicia cylinder such that the protrusion member snap-fits in each respective receiving detent for enabling rotation of each indicia cylinder in each respective recess.

In certain embodiments, each respective ink supply includes an ink pad communicatively coupled to an outer surface portion of each respective indicia cylinder. Each ink supply is located within a respective indicia cylinder. Each ink supply is separately refillable relative to each other ink supply. At least a first color is associated with a first ink supply and a second different color is associated with a second ink supply.

In certain embodiments, at least a first indicia cylinder has a template that prints indicia on a surface to be printed different than indicia caused to be printed by a template associated with a second indicia cylinder. The surface to be printed with the indicia can consist of a sheet of paper. Printed indicia can include line patterns for facilitating hand-writing skills.

In certain embodiments, the housing consists of first and second portions rotatably mounted to each other along a common housing axis. The first housing portion includes the first housing end and the second housing portion includes the second housing end. The second housing portion is configured to be held by a user's hand when printing indicia on a surface to be printed whereby the first housing portion rotates along the housing axis relative to the second housing portion causing the indicia cylinders to print curved indicia on the surface to be printed. The first housing portion rotates at least 180 degrees along the housing axis relative to the second housing portion. The first and second housing portions can be detachably engaged to one another.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF CERTAIN ILLUSTRATED EMBODIMENTS

Figure 1:
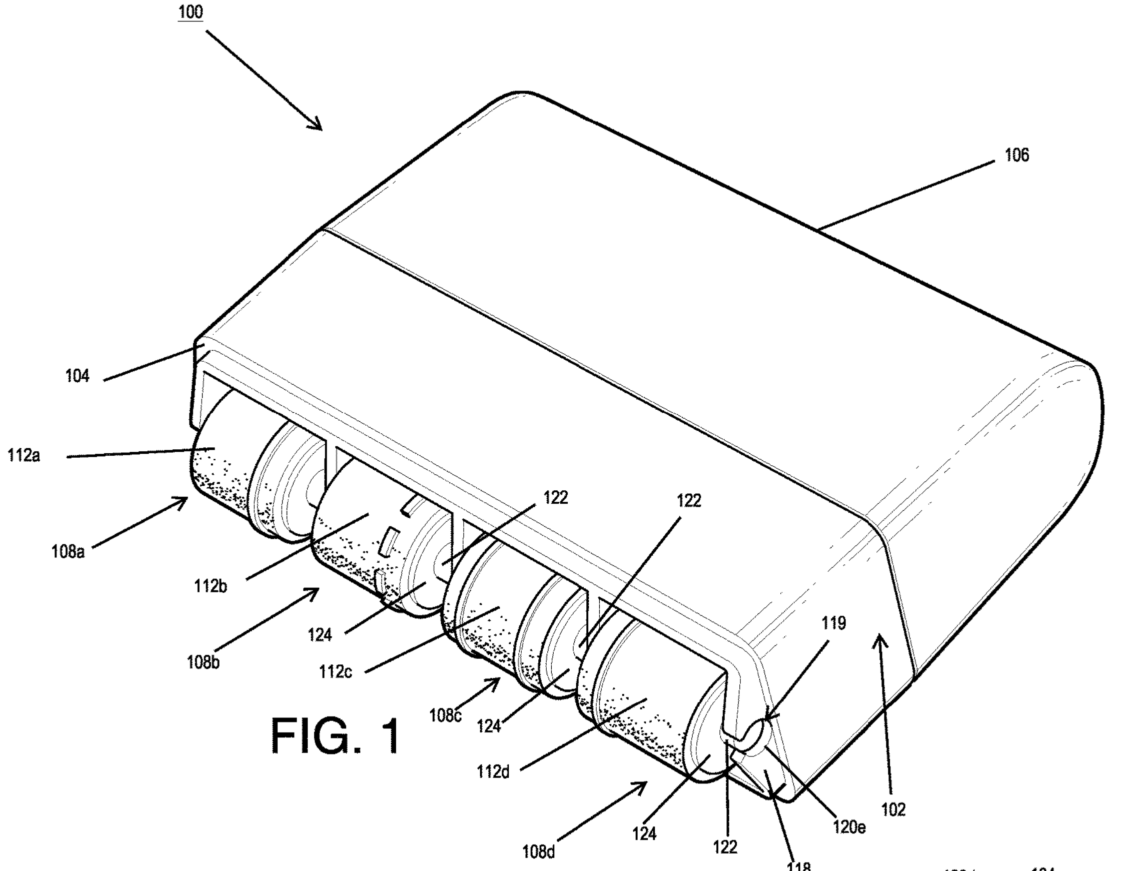
FIG. 1 is a perspective view of an apparatus for printing indicia.

Reference will now be made to the drawings wherein like reference numerals identify similar structural features or aspects of the subject disclosure. For purposes of explanation and illustration, and not limitation, an illustrative view of an embodiment of an apparatus for printing indicia on a surface in accordance with the disclosure is shown in FIG. 1 and is designated generally by reference character 100. Other embodiments and/or aspects of this disclosure are shown in FIGS. 2-7. It is to be appreciated and understood that certain embodiments described herein can be used to print indicia on a surface to facilitate handwriting skills. However, the embodiments depicted in FIGS. 1-7 are not to be understood to be limited to printing indicia on a surface to facilitate handwriting skills as it may be used for various other types of indicia (e.g., pictorial graphics) for other purposes (e.g., imparting artistic impressions).

Figure 7:
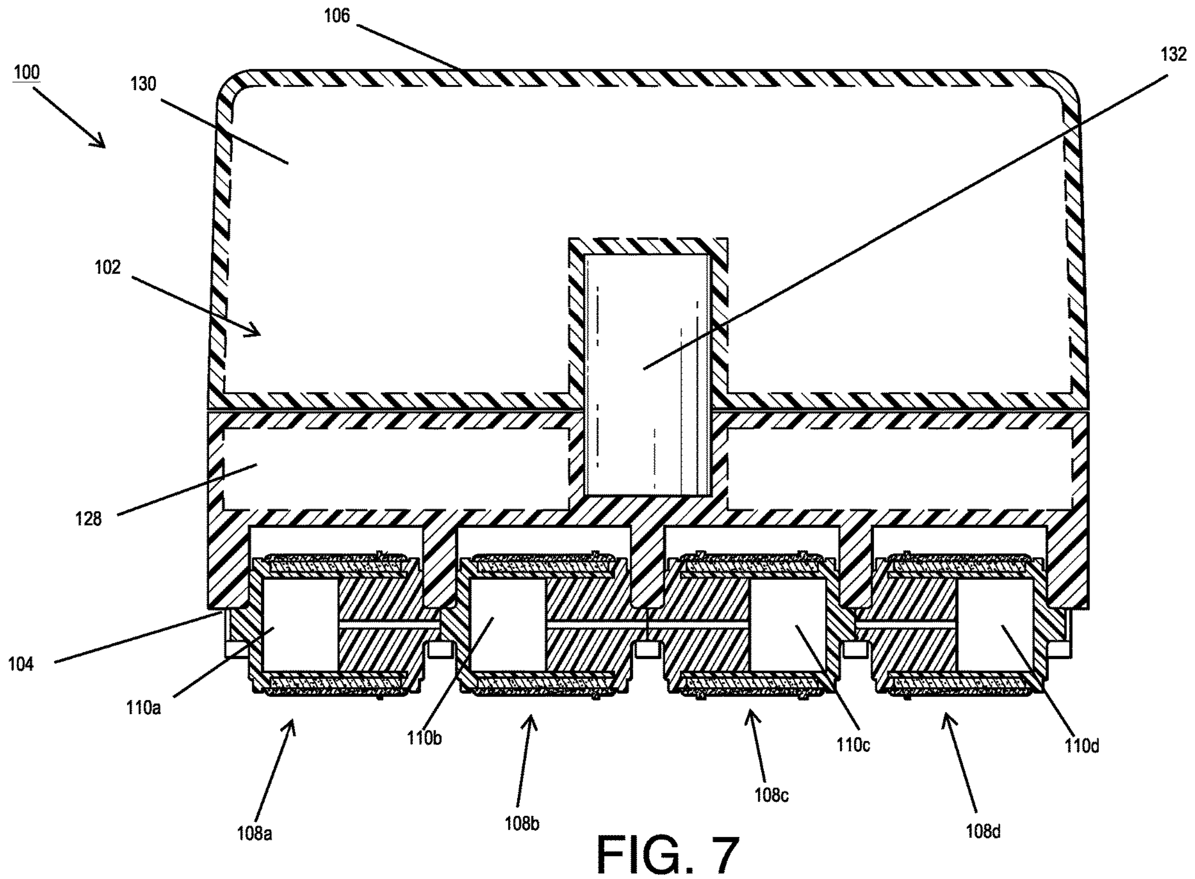
FIG. 7 is a cross-sectional front view of FIG. 4 taken along line VII of FIG. 4.

With reference to FIG. 1, an apparatus 100 for printing indicia on a surface to be printed includes a housing 102 having opposing first and second ends 104, 106, a plurality of indicia cylinders **108*a*-108*d* extending partially from the first end 104 of the housing 102. As best shown in FIG. 7 (and with continuing reference to FIG. 1), the apparatus 100** preferably includes a plurality of ink supplies 110 (110*a*-110*d*), wherein each indicia cylinder 108*a*-108*d* is preferably provided with a dedicated ink supply 110*a*-110*d*.

Figure 2:
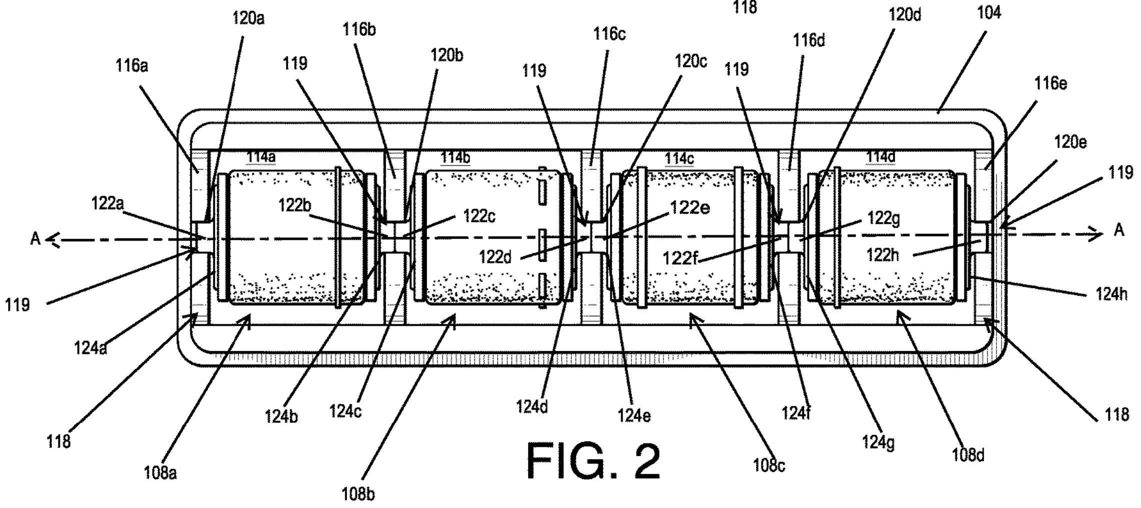
FIG. 2 is bottom planar view of the apparatus of FIG. 1.

Each indicia cylinder 108*a*-108*d* is rotatably mounted along axis A (e.g., as shown in FIG. 2) defined along the first end 104 of the housing 102. An outer surface 112*a*-112*d* of each indicia cylinder 108*a*-108*d* is preferably provided with a template having a defined pattern for imparting indicia on an adjacent surface to be printed (e.g., solid and/or dotted lines). It is to be understood and appreciated that any number of indicia cylinders is contemplated herein suitable for an intended apparatus (e.g., three indicia cylinders) as the embodiments are not to be limited to the four exemplary indicia cylinders shown in FIG. 1.

As shown in FIG. 1, for example, outer surface 112*a* of indicia cylinder 108*a* has a single solid line template, outer surface 112*b* of indicia cylinder 108*b* has a dotted line template, outer surface 112*c* of indicia cylinder 108*c* has a double solid line template, and outer surface 112*d* of indicia cylinder 108*d* has a single solid line template, such that when the apparatus 100 is rolled over a surface to be printed on (e.g., a paper sheet), the result is adaptive lines printed on a surface to facilitate handwriting skills. It is to be understood and appreciated that any combination or variation of templates to aid in handwriting is contemplated herein.

In certain embodiments, each ink supply 110 (e.g., as shown in FIG. 7) communicates to an outer surface portion 112*a*-112*d* of a respective indicia cylinder 108*a*-108*d* such that each indicia cylinder 108*a*-108*d* is communicatively coupled to a dedicated ink supply 110.

With reference now to FIG. 2, in certain embodiments, the first end 104 of the housing 102 defines a plurality of recesses 114*a*-114*d*. Each recess 114*a*-114*d* is configured and adapted to rotatably receive a respective indicia cylinder 108*a*-108*d*. Each recess 114*a*-114*d* is separated from each other by a respective recess wall 116*a*-116*e*. The first end 104 of the housing 102 includes an engagement assembly 118 (e.g., also as shown in FIG. 1) for rotatably engaging a respective indicia cylinder 108*a*-108*d* in a respective recess 114*a*-114*d*. The engagement assembly 118 is configured to provide an anular snap-joint 119 (e.g., also as shown in FIG. 1) between each indicia cylinder 108*a*-108*d* and recess 114*a*-114*d*.

With continued reference to FIG. 2, each engagement assembly 118 (e.g., as also shown in FIG. 1) includes a respective receiving detent 120*a*-120*e* defined in each respective recess wall 116*a*-116*e*. Each indicia cylinder 108*a*-108*d* preferably includes a protrusion member 122 (e.g., also as shown in FIG. 1) extending from each side wall portion 124 of each indicia cylinder 108*a*-108*d* such that the protrusion member 122 snap-fits in each respective receiving detent 120*a*-120*e* defined in each respective recess wall 116*a*-116*e* for enabling rotation of each indicia cylinder 108*a*-108*d* in each respective recess 114*a*-114*d*. As best shown in FIG. 2, each indicia cylinder 108*a*-108*d* has two protrusion members 122 (e.g., 122*a*-122*h*) extending from each respective sidewall (124*a*-124*h*) of each said respective indicia cylinders 108*a*-108*d*.

Figure 3:
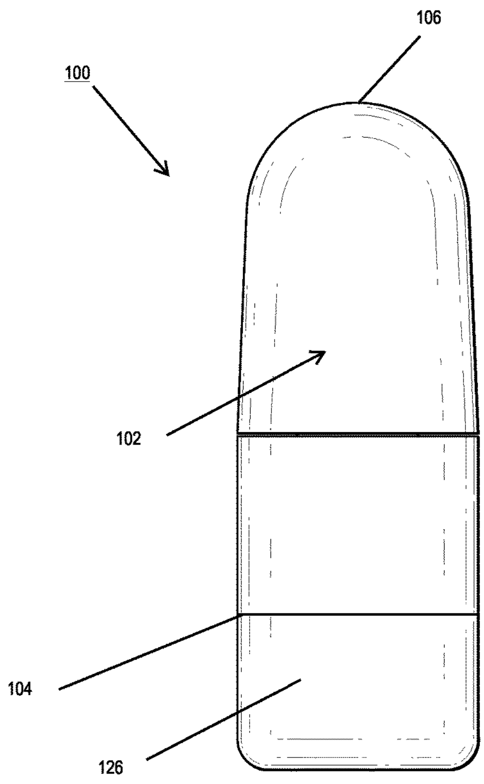
FIG. 3 is side view of the apparatus of FIG. 1, further illustrating a housing cap.
Figure 4:
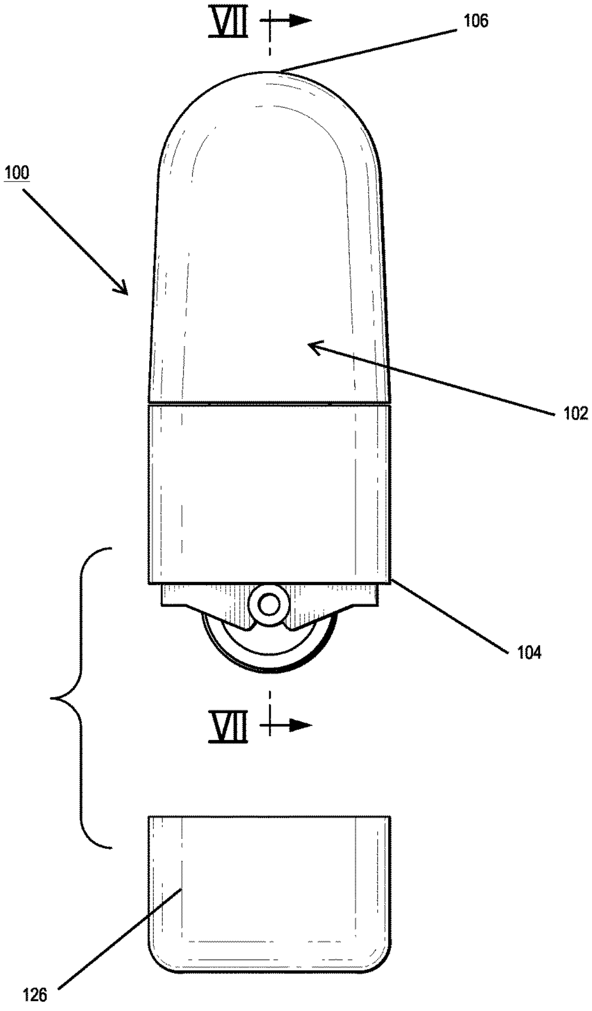
FIG. 4 is a side view of the apparatus of FIG. 1, showing the housing cap detached from the housing.

With reference to FIGS. 3 and 4, a housing cap 126 is preferably provided that is configured to be attached to the first end 104 of the housing 102, for example to preserve the ink supply 110 (e.g., as shown in FIG. 7) of each of the indicia cylinders 108*a*-108*d*. The housing cap 126 is preferably configured to be removable, (e.g., as shown in FIG. 4) when a user is ready to use the apparatus 100.

In certain embodiments, each respective ink supply 110 (e.g., as shown in FIG. 7) includes an ink pad (not shown) communicatively coupled to an outer surface portion of each respective indicia cylinder 108*a*-108*d*. Each ink supply 110 (e.g., as shown in FIG. 7) is preferably separately refillable relative to each other ink supply 110. As shown in the illustrated embodiment of FIG. 7, each ink supply 110 is located within a respective indicia cylinder. However, the ink supply 110 is not to be understood to be limited to be located with an indica cylinder 108*a*-108*d* as the illustrated embodiments will also encompass other location for the ink supply, such as an ink pad provided in a recess portion 114*a*-114*d*.

In certain embodiments, at least a first color is associated with a first ink supply 110 (e.g., as shown in FIG. 7) and a second different color is associated with a second ink supply 110 (e.g., as shown in FIG. 7). Each template of each respective outer surface 112*a*-112*d* of each indicia cylinder 108*a*-108*d* preferably includes a different color. It is noted this is advantageous because different colors provide a clear and consistent visual guide and a structured line output for those who struggle with handwriting skills. Additionally, different colors reduce visual overload for those with visual impairments helping them to stay within the colored lines as opposed to all black and white lines.

In certain embodiments, at least a first indicia cylinder has a template that prints indicia on a surface to be printed different than indicia caused to be printed by a template associated with a second indicia cylinder. For example, as shown in FIG. 1, the template on indicia cylinder 108*a* is different than the template on indica cylinder 108*b*. Each apparatus 100 preferably includes different templates, or any combination of templates on each indicia cylinder. For instance, the surface to be printed with the indicia in one illustrated embodiment consists of a sheet of paper. It is to be understood and appreciated that other suitable surfaces to be printed on is encompassed herein (e.g., printing paper, construction paper, cardboard, posterboard, etc.). It is to be appreciated that printed indicia preferably includes line patterns for facilitating hand-writing skills (e.g., single solid lines, double solid lines, and dotted lines as shown in FIGS. 1 and 2).

Figure 5:
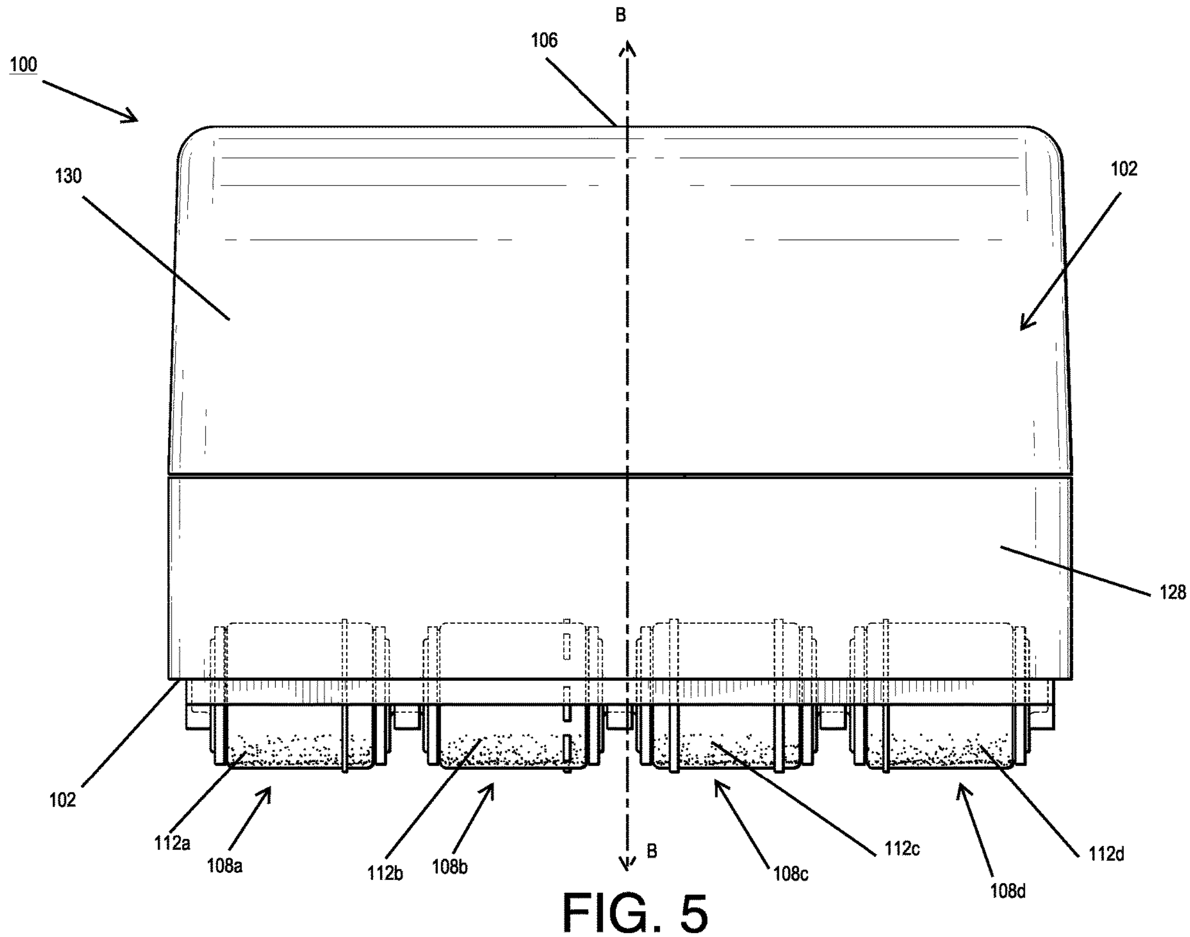
FIG. 5 is a front view of the apparatus in FIG. 1, showing the plurality of indicia cylinders extending partially internal of housing.

With reference now to FIG. 5, the plurality of indicia cylinders 108*a*-108*d* are shown extending partially from the first end 104 of the housing 102, such that when in contact with a surface to be printed on (e.g., a paper sheet), the outer surfaces 112*a*-112*d* of each indicia cylinder 108*a*-108*d* will contact the printing surface. In certain embodiments, the housing 102 consists of first and second portions 128, 130 rotatably mounted to each other along a common housing axis B. The first housing portion 128 includes the first housing end 104 and the second housing portion 130 includes the second housing end 106. The second housing portion 130 is configured to be held by a user's hand when printing indicia on a surface to be printed whereby the first housing portion 128 rotates along the housing axis B relative to the second housing portion 130 causing the indicia cylinders 108*a*-108*d* to print curved indicia on the surface to be printed.

Figure 6:
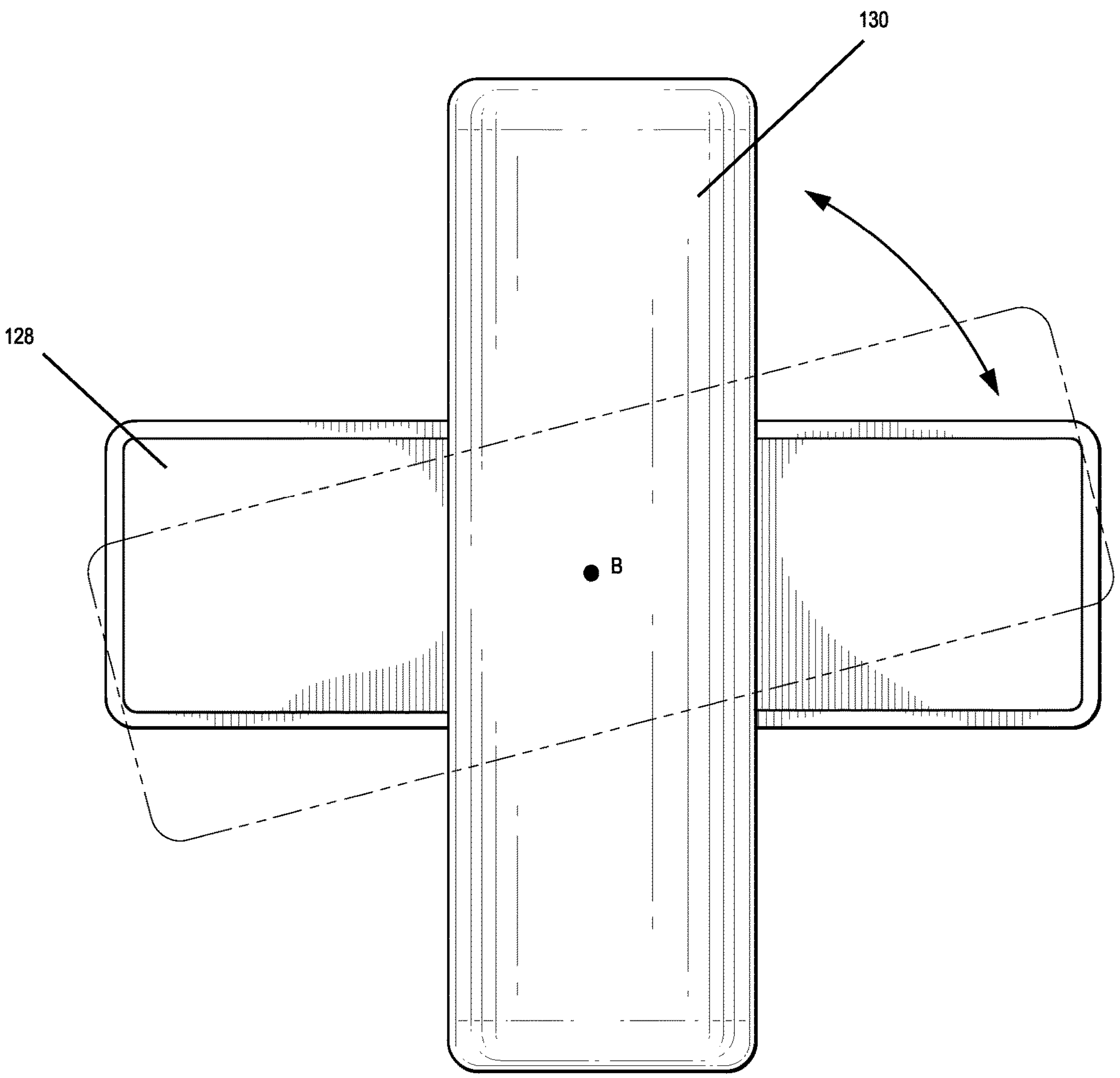
FIG. 6 is a top view of the apparatus of FIG. 1, showing the first housing portion rotating along the common housing axis relative to the second housing portion.

With reference to FIG. 6, the first housing portion 128 rotates at least 180 degrees along the housing axis B relative to the second housing portion 130. In certain embodiments, the first and second housing portions 128, 130 can be detachably engaged to one another (e.g., by an internal threaded mechanism (as shown by 132 in FIG. 7) or any other suitable mechanism).

In certain embodiments, an assembly kit is provided, that preferably consists of at least the aforementioned one housing member 102, at least one aforementioned housing cap 126, and a removal tool configured to remove an indicia cylinder 108_a_-108_d_ from a housing 102. Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An apparatus for printing indicia on a surface to be printed, comprising:

a housing having opposing first and second ends, the housing defining a plurality of recesses in the first end of the housing, wherein each recess is separated from each other by a respective recess wall;

a plurality of individual indicia cylinders extending partially from the first end of the housing, wherein each individual indicia cylinder is rotatably mounted coaxially along a single common axis in a said respective recess, wherein an outer surface of each individual indicia cylinder is provided with a template having a defined pattern for imparting indicia on an adjacent surface to be printed; and a plurality of ink supplies, wherein each respective ink supply individually communicates to an outer surface portion of a respective individual indicia cylinder such that each indicia individual cylinder is communicatively coupled to a dedicated ink supply along the single common axis.

2. The apparatus of claim 1, wherein the first end of the housing includes an engagement assembly for rotatably engaging a said indicia cylinder in a respective said recess.

3. The apparatus of claim 2, wherein the engagement assembly is configured to provide an annular snap-joint between each indicia cylinder and recess.

4. The apparatus of claim 2, wherein each engagement assembly includes a respective receiving detent defined in each respective recess wall and wherein each indicia cylinder includes a protrusion member extending from each side wall portion of each indicia cylinder such that the protrusion member snap-fits in each respective receiving detent for enabling rotation of each indicia cylinder in each respective recess.

5. The apparatus of claim 1, wherein each ink supply is located within a respective indicia cylinder.

6. The apparatus of claim 1, wherein each ink supply is separately refillable relative to each other ink supply.

7. The apparatus of claim 1, wherein a first ink supply of the plurality of ink supplies contains a first color ink and a second ink supply of the plurality of ink supplies contains a second color ink different from the first color ink.

8. The apparatus of claim 1, wherein at least a first indicia cylinder has a template that prints indicia on a surface to be printed different than indicia caused to be printed by a template associated with a second indicia cylinder.

9. The apparatus of claim 1, wherein the surface to be printed with the indicia consists of a sheet of paper.

10. The apparatus of claim 1, wherein printed indicia includes line patterns for facilitating hand-writing skills.

11. An apparatus for printing indicia on a surface to be printed, comprising:

a housing having opposing first and second ends, the housing defining a plurality of recesses in the first end of the housing, wherein each recess is separated from each other by a respective recess wall;

a plurality of individual indicia cylinders extending partially from the first end of the housing, wherein each individual indicia cylinder is rotatably mounted coaxially along a single common axis in a said respective recess, wherein an outer surface of each individual indicia cylinder is provided with a template having a defined pattern for imparting indicia on an adjacent surface to be printed;

a plurality of ink supplies, wherein each respective ink supply individually communicates to an outer surface portion of a respective individual indicia cylinder such that each individual indicia cylinder is communicatively coupled to a dedicated ink supply along the single common axis; and wherein the housing consists of first and second portions rotatably mounted to each other along a common housing axis wherein the first housing portion includes the first housing end and the second housing portion includes the second housing end.

12. The apparatus of claim 11, wherein the second housing portion is configured to be held by a user's hand when printing indicia on a surface to be printed whereby the first housing portion rotates along the housing axis relative to the second housing portion causing the indicia cylinders to print curved indicia on the surface to be printed.

13. The apparatus of claim 11, wherein the first housing portion rotates at least 180 degrees along the housing axis relative to the second housing portion.

14. The apparatus of claim 11, wherein the first and second housing portions are detachably engaged to one another.

15. An assembly kit for printing indicia on a surface to be printed, comprising:

a housing having opposing first and second ends, the housing defining a plurality of recesses in the first end of the housing, wherein each recess is separated from each other by a respective recess wall;

a plurality of individual indicia cylinders extending partially from the first end of the housing, wherein each individual indicia cylinder is rotatably mounted coaxially along a single common axis in a said respective recess, wherein an outer surface of each individual indicia cylinder is provided with a template having a defined pattern for imparting indicia on an adjacent surface to be printed;

a plurality of ink supplies, wherein each respective ink supply individually communicates to an outer surface portion of a respective individual indicia cylinder such that each individual indicia cylinder is coupled to a dedicated ink supply along the single common axis;

a housing cap configured to removably attach to the first end of the housing; and a removal tool configured to remove each individual indicia cylinder from a respective recess in the first end of the housing.

16. An apparatus for printing indicia on a surface to be printed, comprising:

a housing having opposing first and second ends;

a plurality of individual indicia cylinders extending partially from the first end of the housing, wherein each individual indicia cylinder is rotatably mounted coaxially along a single common axis in the first end of the housing and wherein an outer surface of each individual indicia cylinder is provided with a template having a defined pattern for imparting indicia on an adjacent surface to be printed;

a plurality of recesses defined in the first end of the housing along the single common axis, wherein each recess is configured and adapted to rotatably receive a respective indicia cylinder, wherein each recess is separated from each other by a respective recess wall; and a plurality of ink supplies, wherein each respective ink supply individually communicates to an outer surface portion of a respective individual indicia cylinder such that each indicia individual cylinder is communicatively coupled to a dedicated ink supply along the single common axis.

17. The apparatus as recited in claim 16, further including an engagement assembly operatively associated with each recess configured to detachable engage a said cylinder in a said respective recess.

18. The apparatus as recited in claim 16, wherein a first ink supply of the plurality of ink supplies contains a first color ink and a second ink supply of the plurality of ink supplies contains a second color ink different from the first color ink.

* * * * *